(12) United States Patent
Kumbalimutt

(10) Patent No.: US 8,150,960 B2
(45) Date of Patent: Apr. 3, 2012

(54) EVENT FORWARDING

(75) Inventor: Vishwajith Kumbalimutt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/286,757

(22) Filed: Nov. 23, 2005

(65) Prior Publication Data

US 2007/0118642 A1 May 24, 2007

(51) Int. Cl.
*G06F 15/173* (2006.01)

(52) U.S. Cl. ......................... 709/224; 709/238

(58) Field of Classification Search .................. 709/224, 709/201, 206, 238
See application file for complete search history.

(56) References Cited

U.S. PATENT DOCUMENTS

| | | | |
|---|---|---|---|
| 5,471,564 A | 11/1995 | Dennis et al. | |
| 5,764,228 A | 6/1998 | Baldwin | |
| 6,654,815 B1 * | 11/2003 | Goss et al. | 709/248 |
| 6,675,387 B1 | 1/2004 | Boucher et al. | |
| 6,751,665 B2 * | 6/2004 | Philbrick et al. | 709/224 |
| 6,897,870 B1 | 5/2005 | Clegg | |
| 6,922,721 B1 | 7/2005 | Minborg et al. | |
| 6,981,031 B2 * | 12/2005 | French et al. | 709/218 |
| 7,243,124 B1 * | 7/2007 | Gardner et al. | 709/205 |
| 7,266,616 B1 * | 9/2007 | Munshi et al. | 709/246 |
| 7,516,208 B1 * | 4/2009 | Kerrison et al. | 709/224 |
| 7,636,792 B1 * | 12/2009 | Ho | 709/246 |
| 2002/0107951 A1 * | 8/2002 | Teague et al. | 709/223 |
| 2002/0129067 A1 * | 9/2002 | Dames et al. | 707/523 |
| 2003/0084108 A1 * | 5/2003 | Syed | 709/206 |
| 2003/0120762 A1 | 6/2003 | Yepishin et al. | |
| 2003/0200254 A1 | 10/2003 | Wei | |
| 2003/0225829 A1 * | 12/2003 | Pena et al. | 709/203 |
| 2004/0015742 A1 * | 1/2004 | Olson | 714/42 |
| 2004/0148565 A1 | 7/2004 | Davis et al. | |
| 2004/0158638 A1 * | 8/2004 | Peters et al. | 709/227 |
| 2004/0221062 A1 | 11/2004 | Starbuck et al. | |
| 2004/0261083 A1 | 12/2004 | Alcazar et al. | |
| 2005/0039192 A1 * | 2/2005 | Chavez et al. | 719/318 |
| 2005/0137861 A1 | 6/2005 | Dideriksen et al. | |
| 2005/0138111 A1 * | 6/2005 | Aton et al. | 709/201 |
| 2005/0178843 A1 * | 8/2005 | Frohlich et al. | 235/487 |
| 2006/0048110 A1 * | 3/2006 | Medvedev | 717/143 |
| 2006/0053158 A1 * | 3/2006 | Hall et al. | 707/102 |
| 2006/0200488 A1 * | 9/2006 | Chu-Carroll et al. | 707/102 |

FOREIGN PATENT DOCUMENTS

EP 1 585 009 A2 10/2005

OTHER PUBLICATIONS

Dreamweaver Article "Using Events to Interact with Controls", pp. 1-3 1995-2005 Macromedia, Inc. http://www.macromedia.com/devnet/dreamweaver/articles/dotnet_webform2_02.html.
.Net Framework Class Library "Page.OnPreRenderComplete Method", p. 1 http://msdn2.microsoft.com/en-us/library/xbbs4y21.
Dino Esposito "Making SharePoint Web Parts Interact" pp. 1-15 Jun. 15, 2005 http://www.theserverside.net/articles/showarticle.tss?id=WebParts2.

* cited by examiner

*Primary Examiner* — Patrice Winder
*Assistant Examiner* — Ebrahim Golabbakhsh
(74) *Attorney, Agent, or Firm* — Merchant & Gould

(57) ABSTRACT

Handling events. A method may be practiced, for example, in a networked computer system including an event handling computer connected to one or more event generating computers. The method includes an act of generating an event at an event generating computer. The event is rendered into a rendered event in an application independent format by combining static context information with dynamic event information. The rendered event is transmitted to the event handling computer.

18 Claims, 4 Drawing Sheets

EVENT FORWARDING

BACKGROUND

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computers generally execute instructions where the instructions are able to take into account internal and external inputs. For example, a computer instruction may be executed depending on how previous instructions have been executed. Computer instructions may also be executed in a fashion that takes into account various external parameters such as user inputs, sensor inputs, data received from a networked computer, etc.

Understandably, computers may have errors occur when executing instructions. Errors may occur as the result of un-expected inputs or un-received data, bugs in the computer instructions, and even environmental factors that affect computer hardware including heat and energy radiation.

Many computer programs include functionality for generating an event. Events are indicators that an occurrence has taken place at a computer system. Events may be generated when errors occur. Additionally, events may be generated for other reasons such as to indicate that data has been received, instructions have been executed, an input has been received, etc.

Events are typically displayed by tools, such as an event viewer, associated with the application that generated them. The application can display the event to a user in a user readable format to enable the user to be alerted to the event including information regarding what caused the event. To display an event, the event is provided to the appropriate resource which combines static information and dynamic information to display the event. The static information may include, context information such as user names, description strings, category information, etc. Description strings are static descriptions that describe what happened to cause the event. The description stings are combined with dynamic insertion string variables to convey specific information. Categories may classify events. Exemplary categories are security and configuration. Pointers may be coded at design time to identify the static information. Thus, the static information is generally not included in the event, but can be retrieved based on pointers that are included in the event. When an event is displayed, the static information can be added to the event so as to provide context information about the event. The dynamic information may include information in the event including various pieces of runtime information such as the date and time at which event was generated and insertion strings for the event description.

Events may include complex or technical information that the average computer user does not know how to address. Often, a computer user will provide the event to a network administrator or other technical support to provide debugging based on the information in the event. In one example, the network administrator may examine the event on the computer on which the event was generated. This may be inconvenient in that it requires the network administrator to physically locate themselves at the machine where the event was generated and may cause strain on network administrator resources when the network administrator services a large number of individual machines or machines that are located in a geographically large area. Alternatively, the administrator could connect to each remote machine that he is managing to view the events. This also may be cumbersome and time consuming In an alternative example, the network administrator may view the event at a network administrator computer. The network administrator can copy a log file that includes the event to the network administrator computer. However, to view the event properly, the network administrator computer needs to load the tools associated with the application program that generated the event. The may require installing the entire application program. If a network administrator services a large number of individual user computers each with different application programs, different versions of application programs, different operating system, etc., the network administrator may need to maintain a large number of program applications, versions, operating systems, etc. to service the user computers.

When events logs are forwarded to the network administrator and displayed using resources at the network administrator computer, the events lack the static context information pointed to by the pointers in the event. The context information is application specific and as such the resources for that application may not be available when the event is forwarded to the network administrator computer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of handling events. The method may be practiced, for example, in a networked computer system including an event handling computer connected to one or more event generating computers. The method includes an act of generating an event at an event generating computer. The event is rendered into a rendered event in an application independent format by combining static context information with dynamic event information. The rendered event is transmitted to the event handling computer, where it can be viewed by tools such as an event viewer without requiring additional resources.

Another method of handling events is illustrated which may be practiced in a networked computer environment including an event handling computer connected to one or more event generating computers. The method includes subscribing to a publication/subscription service at an event generating computer. Subscribing to a publication/subscription service includes specifying a format for events as either being rendered or raw events. Rendered events include data readable in an application independent format. Raw events include data in a format readable by an application associated with the event. The method further includes receiving an event from the event generating computer in the format specified in the act of subscribing to a publication/subscription service.

Another embodiment includes a computer system for use in a network environment including one or more interconnected computers. The network environment may include an event handling computer configured to display events received at the event handling computer. The computer system includes a processor configured to run program modules and application programs. The computer system further includes a storage medium configured to store data and program modules. The storage medium includes a publication/ subscription service configured to receive subscriptions from one or more event handling computers to receive events. The storage medium further includes an application program configured to generate events. The storage medium also includes an event rendering program module configured to render events as rendered events readable in an application independent format. The rendered events include static context information and dynamic event information. The storage medium also includes a sending program module configured to send rendered events to event handling computers registered with the publication/subscription service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment described in more detail below includes an event handling computer that is designed to handle events from a number of event generating computers. The event handling computer may include a machine operated by a network administrator or other technical support individual. In this way, the network administrator or other technical support individual can service events generated at event generating machines. The event handling computer can subscribe to publication/subscription services at event generating computers that are to be serviced by the network administrator or other technical support individual at the event handling computer.

When subscribing to the publication/subscription services, the subscriptions to the publication/subscription services include filter criteria defining events to be transmitted from the event generating computer to the event handling computer. In addition, the event handling computer can specify a format for events as either being rendered or raw events. Rendered events comprise data readable in an application independent format. For example, the rendered events may be rendered text that includes both static and dynamic information, where the static information provides context information such as usernames, description strings, categories and the like, and the dynamic information provides event specific information, such as date and time at which event was generated and insertion strings for the event description strings. Raw events comprise data in a format readable by tools related to an application that generated the event and, while they may include a pointer to static information, they do not include the static information itself. Events are then received from the event generating computer when the events meet the filter criteria and are in the format specified. Rendered events can be displayed directly at the event handling computer by reference to a rendered event definition that describes how the rendered event should be displayed. The rendered event definition may be, for example, a schema defining the rendered event format. Raw events can be displayed by calling tools associated with an application that generated the event. When raw events are displayed remote from the computer system that generated the event by using tools at the event handling computer, displaying the raw event may not include some context information, such as that information described as being pointed to by the static pointer.

Figure 1:
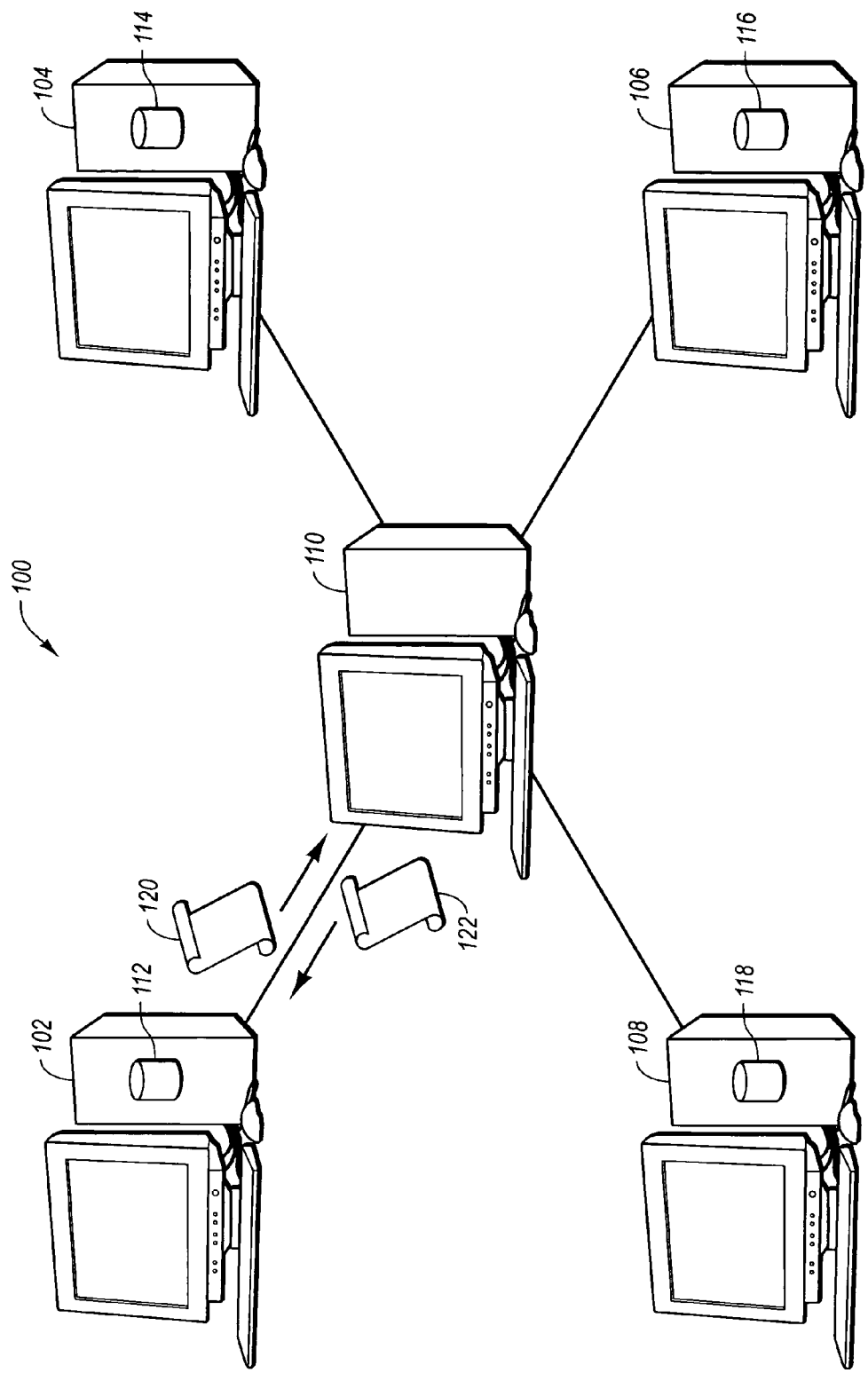
FIG. 1 illustrates a topology including event generating and event handling computers.

Referring now to FIG. 1, a topology 100 is illustrated. The topology 100 includes event generating computers 102, 104, 106, (hereinafter 102-108) coupled to an event handling computer 110. The event generating computers 102-108 and the event handling computer 110 may be interconnected in any one of a number of ways, including but not limited to, through wired and wireless network connections, through direct cable connections, through dial-up or remote network connections, or any other appropriate connection.

Each of the event generating computers includes software applications that generate events. Events may be generated in response to errors. Other events may be generated in response to external inputs, data being received, processes being completed, and the like. The generated events may be referred to herein as raw events. Raw events typically include a pointer to static information and a dynamic portion. For example, and referring now to FIG. 2, an example of a raw event 202 is illustrated. The raw event 202 includes a pointer 204 and a dynamic text portion 206. The pointer 204 is programmed at design time and includes a pointer to static context information 208. The static context information may point to information such as user names, descriptions strings, category information and the like.

The dynamic text portion 206 includes details generated in conjunction with the happening of the event generation. Exemplary details may include, for example, the date and time at which event was generated and insertion strings for the event description strings.

Figure 2:
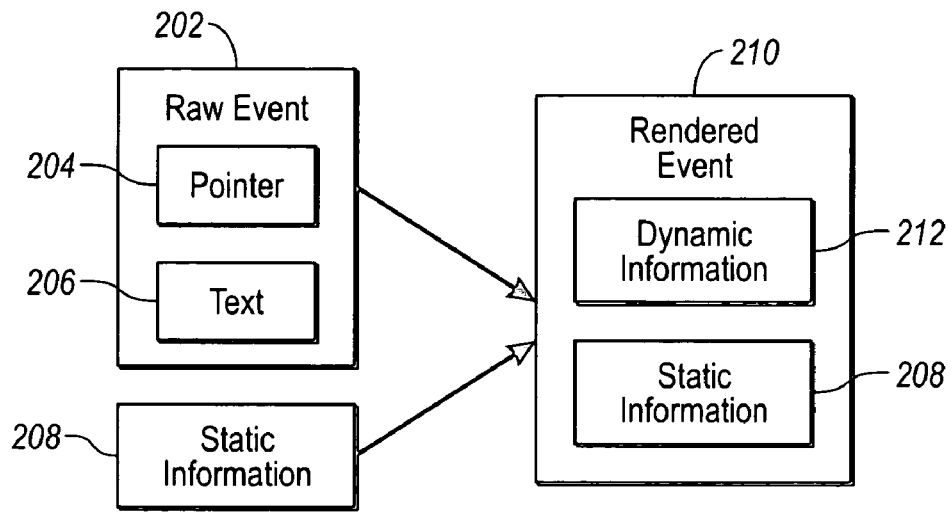
FIG. 2 illustrates raw and rendered events.

Returning again to FIG. 1, in one embodiment, each of the event generating computers 102-108 includes a publication/subscription service 112-118 to which the event handling computer 110 can subscribe by sending a subscription, such as subscription 122 to the publication subscription/service 112. The subscription 122 may include, for example, a filter that includes criteria defining events 120 to be transmitted from the event generating computer 102 to the event handling computer 110. The subscription 122 to the publication/subscription services 112 at the event generating computer 102 may further include a specification of a format for events 120 to be delivered to the event handling computer 110 as either raw 202 or rendered events 210 (FIG. 2). Raw events 202 are described in more detail above. Rendered events 210 include data readable in an application independent format that includes the static information 208 pointed to by the pointer 204 as well as the dynamic information 206. The information in the rendered event 210 may be organized according to a rendered event definition. The rendered event definition may be for example, a schema, such as an XML schema or any other suitable data structure. An exemplary schema for an event subscription is illustrated below.

```
<xs:element name="Subscription">
    <xs:complexType>
        <xs:sequence>
            <xs:element name="Description"
type="xs:string" minOccurs="0"/>
            <xs:element name="CreatorIdentity"
type="winevt:IdentityType"/>
            <xs:element name="Activation"
type="xs:dateTime" minOccurs="0"/>
            <xs:element name="RetryPolicy"
type="winevt:RetryType" minOccurs="0"/>
            <xs:element name="Heartbeat"
type="xs:duration" minOccurs="0"/>
            <xs:element name="Locale"
type="winevt:LocalizedString" minOccurs="0"/>
            <xs:element name="Query"
type="winevt:QueryType" minOccurs="0"/>
            <xs:element name="Bookmark"
type="winevt:BookMarkType" minOccurs="0"/>
        </xs:sequence>
    </xs:complexType>
</xs:element>
```

An exemplary event subscription is illustrated below.

```
<wse:Subscribe>
    <wse:NotifyTo>
        <wsa:Address>http://2.3.4.5/client</wsa:Address>
        <wsa:ReferenceProperties>
            <wmx:ResourceURI>
global application </wmx:ResourceURI>
            <wse:Id> uuid:0883ed62-6df9-
4ac9-ac54-b56b696d2de7 </wse:Id>
        </wsa:ReferenceProperties>
    </wse:NotifyTo>
    <wse:Expires>PT30M</wse:Expires>
    <wse:Filter
Dialect="microsoft.windows.events/2004/06/query">
    <Subscription
xmlns="http://schemas.microsoft.com/2004/07/windows/events/winevt">
        <Description> Collect SQL Events
</Description>
        <CreatorIdentity>
            <UserID
UserType="UPN">vishwak@ntdev.corp.microsoft.com</UserID>
        </CreatorIdentity>
        <Activation>2004-06-22T09:30:47-
05:00</Activation>
        <RetryPolicy>
            <RetryInterval> PT2M
</RetryInterval>
            <MaxRetries> 5 </MaxRetries>
        </RetryPolicy>
        <Heartbeat> PT45M </Heartbeat>
        <Locale lang="en-us"/>
        <Query>
            <ContentFormat
Type="RenderedEvents"/>
                <Suppress> blah </Suppress>
                <Suppress> blah2 </Suppress>
                <Select> blah3 </Select>
                <Select> blah4 </Select>
        </Query>
        <Bookmark>
            <RecordID ID="25"
TimeWritten="2004-06-28T09:30:47-05:00"/>
            <LogfileName>String</LogfileName>
            <LastEventTime BootID="0"
TickCount="0" SystemTime="2004-06-28T09:30:47-05:00"/>
            <LastHeartBeatTime>2004-06-
28T08:30:47-05:00</LastHeartBeatTime>
        </Bookmark>
    </Subscription>
</wse:Filter>
    <wmx:DeliveryMode> trap </wmx:DeliveryMode>
    <wmx:Batching>
        <MaxItems>10</MaxItems>
        <MaxTime>PT20S</MaxTime>
        <MaxCharacters>8192</MaxCharacters>
    </wmx:Batching>
    <!-- Crimson add-ons -->
</wse:Subscribe>
```

In one particular embodiment, Web Services may be used to define and transmit events 120 as rendered events 210. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated.

In one embodiment, if an event occurs that meets the filter criteria, and the specified format is a rendered event 210, the event generating computer 102 will render the event as a rendered event 210 according to the rendered event definition. The event 120 will then be sent to the event handling computer 110. The event 120 may be included in an event package that contains one or more events based on the batching specified in the subscription request. The event package may contain a subscription ID, a locale and the content type which can be raw events or rendered events. A schema for an event package is as shown below:

```
<xs:element name="EventPackage">
    <xs:complexType>
        <xs:sequence>
            <xs:element name="SubscriptionID"
type="winevt:GUIDType"/>
            <xs:element name="Locale" type="xs:string"/>
            <xs:element name="BatchSize"
type="xs:integer"/>
            <xs:element name="ForwardedEvents"
type="winevt:ForwardedEventType" maxOccurs="unbounded"/>
        </xs:sequence>
    </xs:complexType>
</xs:element>
```

An example event package is as shown below:

```
<EventPackage>
    <SubscriptionID> uuid:6bcdc900-c4db-11d8-9669-
0800200c9a66</SubscriptionID>
    <Locale>en-us</Locale>
    <BatchSize>1</BatchSize>
    <ForwardedEvents>
        <RenderedElements>
            <EventDescription>Drive C: is out of
```

```
space</EventDescription>
                <EventCategory>None</EventCategory>
            </RenderedElements>
        <Event>
            <System>
                <EventID>2147483647</</EventID>
                <Type>255</Type>
                <SubType>255</SubType>
                <Level>255</Level>
                <TimeCreated BootID="0" Tickcount="0"
SystemTime="2001-12-17T09:30:47"/>
                <Source Name="String" Version="String"
PublicKeyToken="String" LegacyName="String"/>
                <Category>65535</Category>
                <Correlation TaskID=""{00000000-0000-0000-
0000-000000000000}"" SeqNumber="0" ParentTaskID=""{00000000-0000-0000-
0000-00000000000}"" ParentSeqNumber="0"/>
                <Excecution ProcessName="String"
ProcessID="0" ThreadID="0"/>
                <Module Path="String"/>
                <Channel>Global/Application</Channel>
                <Computer>server10.ms.com</Computer>
                <Security UserSid="administrator"/>
                <SourceCodeID>255</SourceCodeID>
            </System>
            <ForwardingInfo>
                <Traversals>
                    <TargetComputer
Name="server12.ms.com"/>
                    <TimeSent SysTime="2001-12-
17T09:30:47"/>
                    <TimeReceived SysTime="2001-12-
17T09:30:47"/>
                </Traversals>
            </ForwardingInfo>
            <Tags>
                <Tag>String</Tag>
            </Tags>
    <BinaryData>R0lGODlhcgGSALMAAAQCAEMmCZtuMFQxDS8b</BinaryData>
            <InsertionStrings>
                <InsertionString>C:</InsertionString>
            </InsertionStrings>
        </Event>
    </ForwardedEvents>
</EventPackage>
```

For example, an event indicating that the disk drive C: has read errors is represented as follows:

```
<ForwardedEvent>
    <Message>
                Drive C: has read errors
    </Message>
    <Event>
        <_System
        <_System>
        <EventSource="SQL"/>
            <Severity> Error </Severity>
            <Category> 12 </Category>
            <InsertionStrings>
                <InsertionString> C: </InsertionString>
            </InsertionStrings>
        </Event>
</ForwardedEvent>
```

An example rendered event is as shown below:

```
<Event
xmlns="http://schemas.microsoft.com/2004/07/windows/events/winevt"
xmlns:xsi="http://www.w3.org/2001/XMLSchema-instance"
xsi:schemaLocation="http://schemas.microsoft.com/2004/07/windows/
events/winevt
C:\ntspecs\wmi\Longhorn\Transport\Specs\SOAP\eventpackage.xsd">
    <SystemProperties>
        <EventID>1234</EventID>
        <Type>Error</Type>
        <TimeCreated SystemTime="2001-12-17T09:30:47"/>
        <RecordID ID="124" TimeWritten="2004-06-17T09:30:47"/>
        <Source Name="SQL service"/>
        <Channel>Global/Application</Channel>
        <System>sql10.ms.com</System>
    </SystemProperties>
    <RenderedInfo>
        <EventDescription>Drive C: is out of
space</EventDescription>
        <EventCategory>None</EventCategory>
        <Locale>Text</Locale>
    </RenderedInfo>
</Event>
```

Events from BMC (baseboard management controller) machines and other hardware monitoring machines can have additional custom data along with standard properties. A BMC is a specialized microcontroller embedded on the motherboard of a computer. The BMC manages the interface between system management software and computer hardware. The BMC may generate events based on conditions such as temperature, cooling fan speeds, power mode, operating system (OS) status, etc. An example event with additional hardware information is as shown below:

```
<Event
xmlns="http://schemas.microsoft.com/2004/07/windows/events/winevt"
xmlns:xsi="http://www.w3.org/2001/XMLSchema-instance"
xsi:schemaLocation="http://schemas.microsoft.com/2004/07/windows/
events/winevt
C:\ntspecs\wmi\Longhorn\Transport\Specs\SOAP\eventpackage.xsd">
    <SystemProperties>
        <EventID>12345</EventID>
        <Type>Warning</Type>
        <TimeCreated SystemTime="2001-12-17T09:30:47"/>
        <RecordID ID="122"/>
        <Source Name="IPMI"/>
        <Channel>Hardware SEL</Channel>
        <System>server10.ms.com</System>
    </SystemProperties>
    <RenderedInfo>
        <EventDescription>Front Fan going slow</EventDescription>
        <Locale>en-us</Locale>
    </RenderedInfo>
    <CustomData>
            <SensorType>blah</SensorType>
            <SensorName>Fan #7</SensorName>
            <FirmwareVersion>1.0.1.1</FirmwareVersion>
    </CustomData>
</Event>
```

At the event handling computer 110, a rendered event 210 can be displayed by reference to the rendered event definition. In this way, the rendered event 210 can be displayed without the need to launch the application that generated the event or an application associated with the event or without launching tools associated with the application that generated the event.

When the specified event format is a raw event 202, and when the event 120 is received at the event handling computer 110, a raw event 202 can be displayed at the event handling computer 110 by running the application or tools associated with the event at the event handling computer 110.

Figure 3:
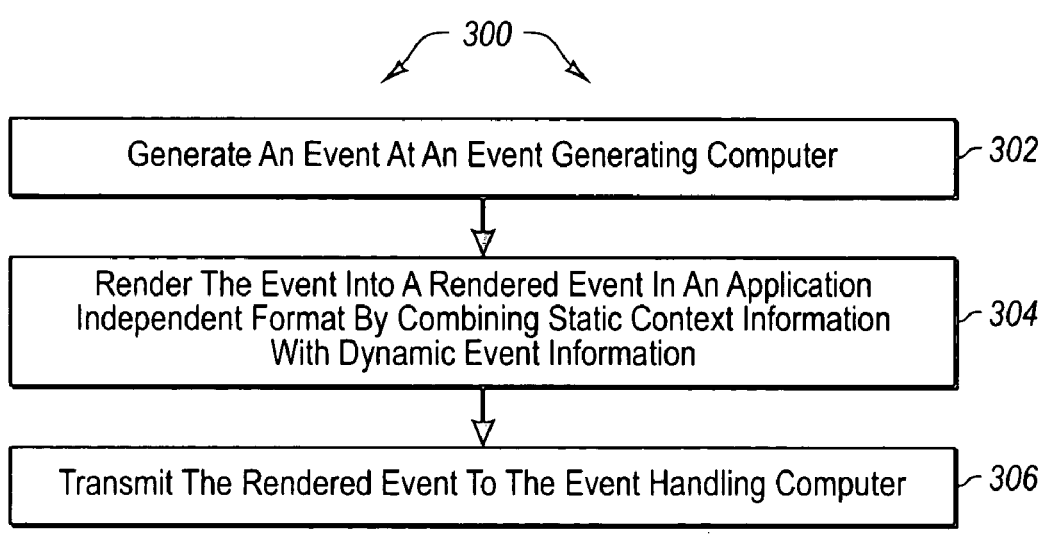
FIG. 3 illustrates a method of handling events.

Referring now to FIG. 3, a method of handling events is illustrated. The method 300 may be practiced, for example, in a networked environment including an event handling computer connected to one or more event generating computers. The method 300 includes generating an event at an event generating computer (act 302). As described previously in conjunction with FIG. 1, an event may be generated at event generating computer 102. The event may be generated in response to an error or for other appropriate reasons.

The method 300 further includes an act of rendering the event into a rendered event in an application independent format by combining static context information with dynamic event information (act 304). As illustrated in FIG. 2, a rendered event 210 includes dynamic information 212 and static information 208. Rendering an event includes, for example, including text information 206 describing the dynamic information 212 about an event with static information 208 that provides context information about the event. As described previously, the dynamic information 212 may include, for example, specific information about the error or other event causing action including information such as date and time at which event was generated and insertion strings for the event description. The static information may include, for example, at least one of username, description string, or category.

In one embodiment, rendering the event (act 302) may include rendering the event in a written language specified by the event handling computer. Referring now to FIG. 1, the event handling computer 110 may specify to the event generating computer 102 in what language events should be rendered. For example, if the event handling computer 110 is being operated by a system administrator in Germany and the event generating computer 102 is being operated by a user in the United States, the event handling computer 110 may specify that events are to be rendered in German. This may be accomplished in one embodiment by specifying the language as part of a subscription 122 for receiving events. Thus, the event generating computer 102 may include functionality to render events (act 302) in a written language specified in a subscription 122.

Returning again to FIG. 3, the method 300 further includes an act of transmitting the event to the event handling computer (act 306). Transmitting the event to the event handling computer (act 306) may include for example the event generating computer 102 pushing the event 120 to the event handling computer 110. In an alternative embodiment, transmitting the event to the event handling computer (act 306) may include having the event 120 pulled by the event handling computer 110.

In one embodiment, the method 300 may further include an act of receiving a message from the event handling computer specifying filter criteria defining what events should be transmitted to the event handling computer. As described above, the event handling computer 110 can subscribe to a publication/subscription service 112 at an event generating computer 102 so as to receive events 120 from the event generating computer 102. In one embodiment, the subscription 122 may be a message, such as for example a SOAP xml message, that includes filter criteria specifying what events should be received.

The method may further include an act of receiving a message from the event handling computer specifying a format for events as either being rendered or raw events. Rendered events include data readable in an application independent format. Raw events include data in a format readable by an application or tools associated with the application that generated the event. An event handling computer 110 may, in one embodiment, include a specification of the format for events 120 as a part of a subscription 122 to an event generating computer 102.

In one embodiment, the method 300 may further include providing an indication to the event handling computer that the event is a rendered event. For example, in FIG. 1, the event 120 provided to the event handling computer 110 may be packaged as an xml SOAP message which includes a field specifying what type of event the event 120 is. The field may specify that the event is, for example, a rendered event. This provides the event handling computer 110 with an indication of how to display the event 120. If the event 120 is a rendered event, the event handling computer 110 may display the event by reference to a schema, such as an xml schema, defining how the event should be displayed.

Figure 4:
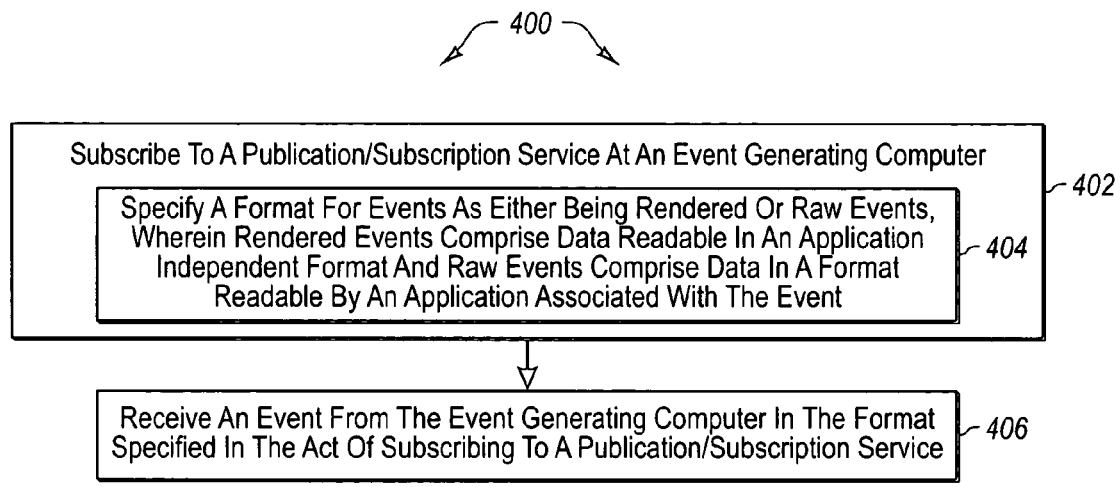
FIG. 4 illustrates another method of handling events.

Referring now to FIG. 4, a method of handling events 400 is illustrated. The method 400 may be practiced, for example, in a networked environment including an event handling computer connected to one or more event generating computers. The method includes an act of subscribing to a publication/subscription service at an event generating computer (act 402). Subscribing to a publication/subscription service (act 402) includes an act of specifying a format for events as either being rendered or raw events (act 404). Rendered events include data readable in an application independent format. Raw events include data in a format readable by an application or tools associated with the event. Such an application may be, in some embodiments, the application that generated the event. As illustrated above in conjunction with the description of FIG. 1, an event handling computer 110 can subscribe to a publication/subscription service 112 of an event generating computer 102 by sending a subscription 122. The subscription 122 may specify, for example, whether raw or rendered events should be sent to the event handling computer 110. Subscribing to a publication/subscription service (act 402) may further include specifying filter criteria defining events to be transmitted from the event generating computer to the event handling computer. The filter criteria may be included, for example, in a subscription 122 such as that illustrated in FIG. 1. Specifying filter criteria defining events to be transmitted from the event generating computer to the event handling computer may include in one exemplary embodiment specifying at least one of channels to be monitored, type of event, or time of event.

In one embodiment, subscribing to a publication/subscription service (act 402) may further include specifying language criteria including an indication of a written language in which the event is to be rendered. For example, a language may be specified that corresponds to a language spoken by a network administrator at the event handling computer 110.

In one embodiment, specifying filter criteria and specifying a format for events as either being rendered or raw events includes sending an XML message to the event generating computer.

The method 400 further includes an act of receiving an event from the event generating computer in the format specified in the act of subscribing to a publication/subscription service (act 406). As illustrated in FIG. 1, an event 120 may be received by an event handling computer 100. The event 120 meets the filter criteria when filter criteria is specified in the act of subscribing to a publication/subscription service at an event generating computer (act 402).

Receiving an event (act 406) may include receiving a rendered event including a static portion and a dynamic portion where the static portion includes context information and the dynamic portion includes information generated in conjunction with generating the event. The method 400 further includes processing the rendered event by displaying the event in an application independent format. For example, the event may be displayed in a text viewer as the rendered event is sufficiently rendered so as to provide both static context information and dynamic information.

In another embodiment, receiving an event (act 406) may include receiving a raw event. In this example, the method 400 further includes processing the raw event by displaying the raw event using the application associated with the raw event. For example, an application on the event handling computer 110 may be that same as or associated with an application on the event generating computer 102 that generated the event. Thus, the event handling computer can process the event by displaying the event using an application that was designed to display the event.

Receiving an event from the event generating computer (act 406) may be accomplished by pulling events 120 from the event generating computer 102. In an alternative embodiment, the events 120 may be pushed from the event generating computer 102.

Figure 5:
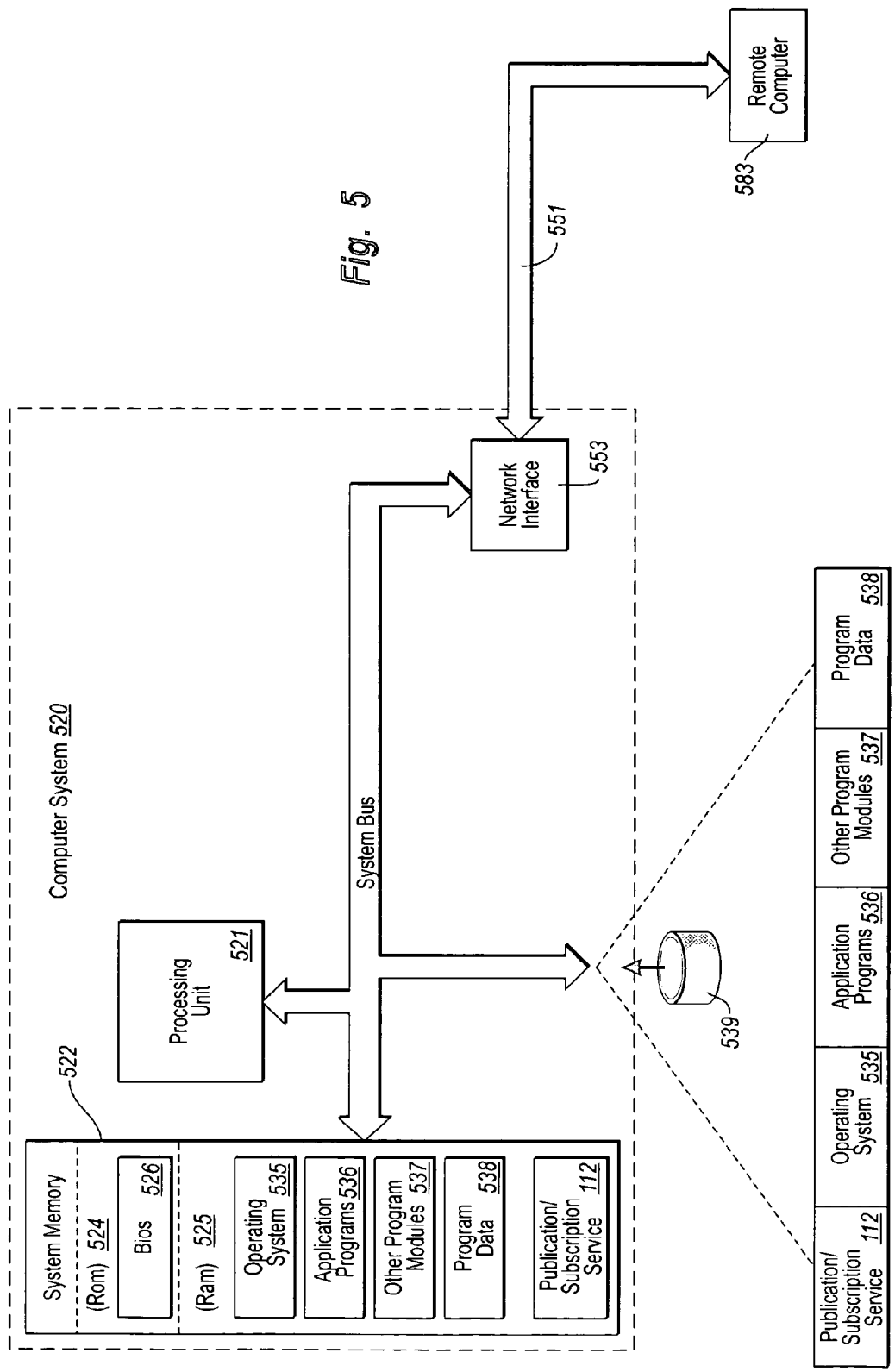
FIG. 5 illustrates a computer system where events can be generated.

Referring now to FIG. 5, a computer system 520 is illustrated. The computer system 520 may be used to implement some embodiments. The computer system 520 includes a processing unit 521. Processing unit 521 functions as a processor configured to run program modules 537 and application programs 536. Processing unit 521 may further be configured to execute operating instructions such as those contained in an operating system 535 and instructions contained in a BIOS 526. The computer system 520 includes a system bus 523 which connects the processing unit 521 to storage mediums such as system memory 522 and a computer hard drive 539 through a hard disk drive interface 532. The storage mediums illustrated, system memory 522 and the hard disk 539, are configured to store program data 538, program modules 537, application programs 536, and the operating system 535. As illustrated the system memory 522 includes a ROM 524 and a RAM 525. The ROM 524 may include the BIOS 526. The BIOS 526 includes bootstrap code to enable the computer system 520 to load the operating system 535 from the hard drive 539 to the RAM 525 where it can be operated on by the processing unit 521. The operating system 535 can then be used to load the application programs 536 and other program modules 537 from the hard drive 539 to the RAM 525.

As shown in FIG. 5, the computer system 520 further includes a publication/subscription service 112 stored on the storage mediums. The subscriptions/publication service 112 is configured to receive subscriptions from one or more event handling computers such that the event handling computers can receive the events. For example, as illustrated in FIG. 1, an event handling computer 110 may send a subscription 122 to a publication/subscription service 112 on an event generating computer 102 so as to receive events 120.

In one embodiment one or more of the application programs 536 may be configured to generate events. As described above, an application program may generate events in response to errors or for other reasons. The computer system 520 further includes other program modules 537. In one embodiment, one program module is an event rendering program module. The event rendering program module is configured to render events as rendered events readable in an application independent format. The rendered events include static context information and dynamic event information as described previously herein. The computer system 520 may further include a sending program module configured to send rendered events to event handling computers registered with the publications/subscription service 112. The event rendering module and sending program module may be embodied as a single program module. Thus, as described previously herein in conjunction with the description of FIG. 1, an event generating computer 102 will send events 122 to event handling computer 110 when the event handling computer 110 has subscribed using a subscription 122 with a publication/subscription service 112.

In the example shown in FIG. 5, an event handling computer may be embodied as a remote computer system 583 connected to a network interface 553 through a network connection 551. As described previously, the network connection 551 may be any appropriate network connection such as, but not limited to, wireless and wired network connections including Ethernet, Bluetooth, and other appropriate connections.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a networked computer environment including an event handling computer connected to one or more event generating computers, a method of handling events comprising:
   receiving at an event generating computer a message from the event handling computer specifying a format for events to be sent to the event handling computer as either being rendered or raw events, wherein rendered events comprise data readable in an application independent format and raw events comprise data in a format readable by an application that generated an event;
   generating an event at the event generating computer;
   rendering the event into the format specified by the event handling computer, wherein the specified format comprises a rendered event in an application independent format by combining static context information with dynamic event information; and
   transmitting the rendered event and a rendered event definition to the event handling computer in an event package including a plurality of rendered events and corresponding rendered event definitions based on a batching request specified in the message received from the event handling computer, the event package indicating the format specified by the event handling computer, the rendered event definition comprising an XML schema defining how the rendered event is to be displayed at the event handling computer.

2. The method of claim 1, wherein rendering comprises rendering the event in a language specified by the event handling computer.

3. The method of claim 1, further comprising receiving a message from the event handling computer specifying filter criteria defining what events should be transmitted to the event handling computer.

4. The method of claim 1, wherein transmitting the event to the event handling computer comprises pushing the rendered event to the event handling computer.

5. The method of claim 1, wherein transmitting the event to the event handling computer comprises having the rendered event pulled by the event handling computer.

6. The method of claim 1, further comprising providing an indication to the event handling computer that the event is a rendered event.

7. The method of claim 1, wherein the static context information includes at least one of a user name, a description string or a category.

8. In a networked computer environment including an event handling computer connected to one or more event generating computers, a method of handling events comprising:
   subscribing to a publication/subscription service at an event generating computer, wherein subscribing to a publication/subscription service comprises:
      transmitting a message from an event handling computer to the event generating computer, wherein the message specifies a format for events to be sent to the event handling computer as either being rendered events or raw events, wherein rendered events comprise data readable in an application independent format and raw events comprise data in a format readable by an application associated with an event; and
   receiving an event from the event generating computer in the format specified by the event handling computer in the act of subscribing to the publication/subscription service, wherein the specified format is rendered events and the received event is received with a rendered event definition comprising an XML schema defining how the rendered event is to be displayed at the event handling computer, wherein the rendered event and the rendered event definition are received in an event package including a plurality of rendered events and corresponding rendered event definitions based on a batching request specified in the message transmitted from the event handling computer.

9. The method of claim 8, wherein subscribing to a publication/subscription service further comprises specifying filter criteria defining events to be transmitted from the event generating computer to the event handling computer, and wherein receiving an event from the event generating computer comprises receiving an event meeting the filter criteria.

10. The method of claim 9, further comprising sending an XML message to the event generating computer, wherein the XML message specifies the filter criteria and specifies the format for events as either being rendered or raw events.

11. The method of claim 9, wherein specifying filter criteria defining events to be transmitted from the event generating computer to the event handling computer comprises specifying at least one of channels to be monitored, type of event, or time of event.

12. The method of claim 8, wherein receiving an event comprises receiving the rendered event comprising a static portion and a dynamic portion, the static portion including context information and the dynamic portion including information generated in conjunction with generating the event, the method further comprising processing the rendered event by displaying the event in an application independent format.

13. The method of claim 8, wherein subscribing to publication/subscription service further comprises specifying language criteria including an indication of a language in which the event is to be rendered.

14. The method of claim 8, wherein receiving the event from the event generating computer comprises pulling events from the event generating computer.

15. A computer system for use in a network environment including one or more interconnected computers, including an event handling computer configured to display events received at the event handling computer, the computer system comprising:

a processing unit configured to run program modules and application programs;

a memory configured to store data and program modules, memory comprising:

a publication/subscription service configured to receive subscriptions from one or more event handling computers to receive events, wherein a subscription specifies a format for events to be sent to the one or more event handling computers as either raw or rendered events, wherein rendered events comprise data readable in an application independent format and raw events comprise data in a format readable by an application that generated an event;

an application program configured to generate events;

an event rendering program module configured to render events into the format specified by the one or more event handling computers, wherein the specified format comprises rendered events including static context information and dynamic event information; and a sending program module configured to send rendered events and corresponding rendered event definitions to an event handling computer registered with the publication/subscription service in an event package based on a batching request specified in a subscription received from the event handling computer, the event package indicating a format specified by the event handling computer, the rendered event definitions comprising XML schemas defining how corresponding rendered events are to be displayed at the event handling computer.

16. The computer system of claim 15, wherein the event render program module and the sending program module are embodied as one module.

17. The computer system of claim 15, wherein the sending program module comprises functionality for pushing rendered events to the event handling computer.

18. The computer system of claim 15, wherein the event rendering program module comprises functionality for rendering events in a language specified by an event handling computer.

* * * * *